Oct. 4, 1960   R. T. BEERS   2,954,994
SOCKET RETAINER FOR ROTARY POWER TOOLS
Filed Dec. 23, 1957   3 Sheets-Sheet 3
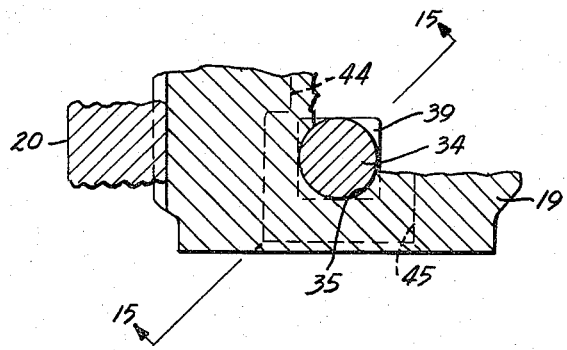
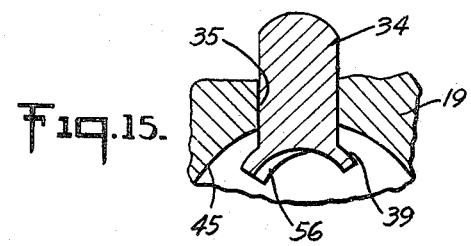
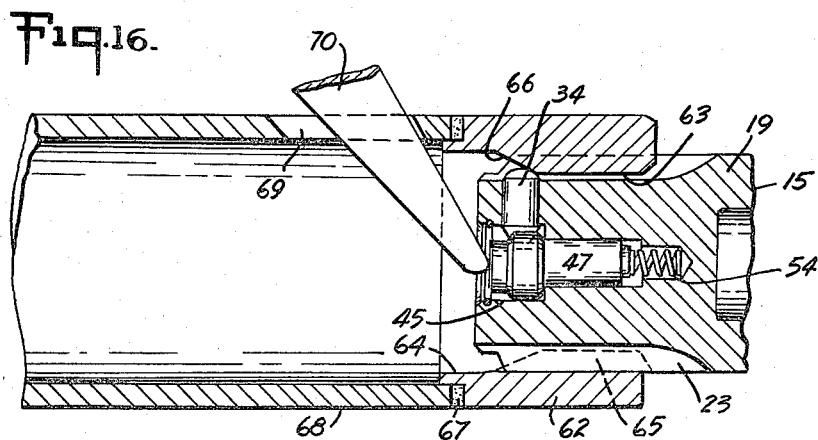
INVENTOR.
ROBERT T. BEERS
BY
ATTORNEY

United States Patent Office 2,954,994
Patented Oct. 4, 1960

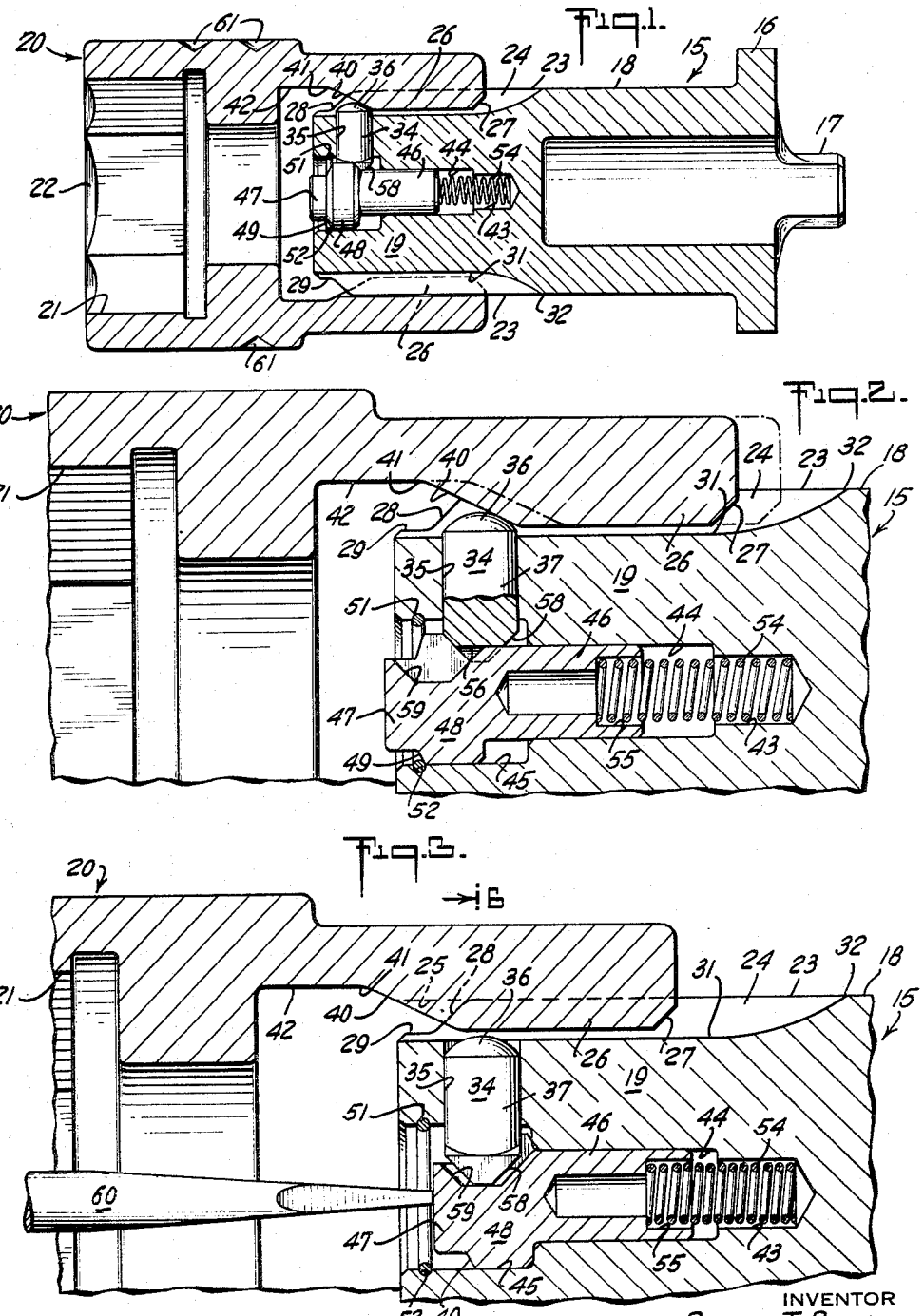

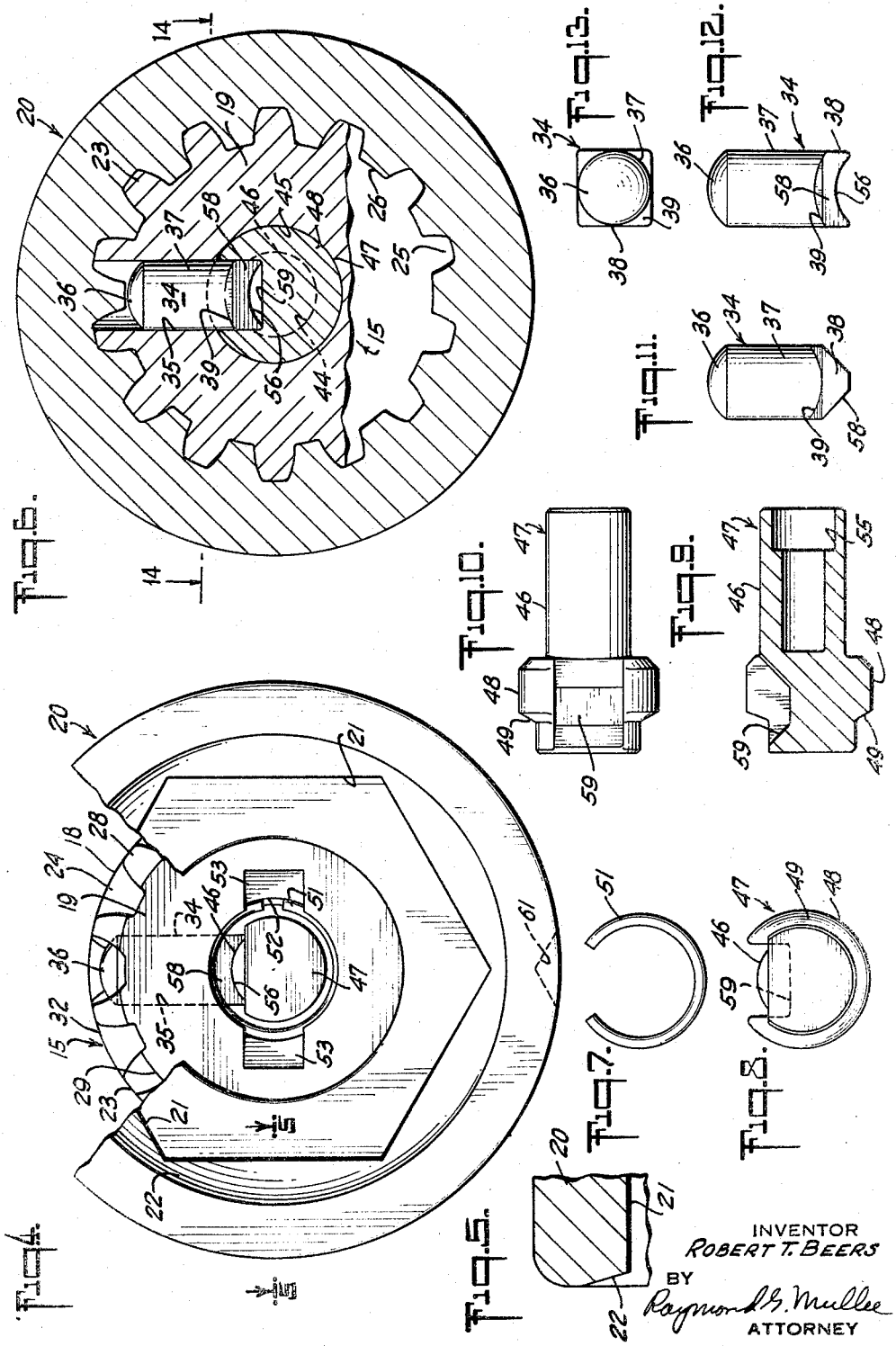

2,954,994

SOCKET RETAINER FOR ROTARY POWER TOOLS

Robert T. Beers, New York, N.Y., assignor to Chicago Pneumatic Tool Company, New York, N.Y., a corporation of New Jersey Filed Dec. 23, 1957, Ser. No. 704,467

15 Claims. (Cl. 287—119)

This invention relates to rotary power operated tools and more particularly to a retainer for locking a wrench socket against accidental separation from its driving shaft. The invention has especial, though not exclusive, application to impact wrenches in which the anvil has an extended shank which drives the socket with a series of torsional impacts. During the transmission of impacts, the shank is twisted intermittently and therefore is liable to fatigue failure in areas where the strain is excessive, particularly alongside a hole in the shank, which may have been provided for the reception of a retaining pin.

Various arrangements have been proposed and used for detachably locking a wrench socket to its drive shank. Such prior locking devices usually have one or more undesirable characteristics as follows:

(1) An arrangement of registering bores in both the socket member and shank for the reception of a diametrically extending locking pin with the resulting necessity of providing a supplementary retainer to keep the locking pin from coming out of the socket.

(2) Location of the locking pin and of the associated radial bore in the driving portion of the shank, where the shank is subjected to great torsional strains, with the resulting liability of breakage or fatigue failure adjacent the bore.

(3) Inaccessibility of the releasing means for the retaining device, with resulting loss of time to the operator or unnecessary complication of structure to give the operator access by remote control.

(4) A socket recess of limited axial depth for the reception of the locking detent thus requiring a precise axial alignment of the shank and socket to make the locking device effective, which alignment may fail to occur if the parts are not made to close tolerances or if they become worn in use.

(5) The need for registration of the locking detent with a socket recess of limited circumferential extent with the result that the operator loses time in orienting or adjusting the socket into proper angular relation with the driving shank when he assembles the parts.

The general object of the present invention is to overcome the disadvantages of prior devices, as above mentioned. More specifically, an object of the invention is the provision of a wrench socket retaining device which is simple in construction, reliable and effective in operation; which does not require a hole in any part of the shank which might be unduly weakened thereby; which does not require any radial opening in the socket member or special retainer to keep the detent from coming out of the socket; which permits the socket to float axially upon the shank without loss of effectiveness of the retainer; and which automatically and securely locks into position when the parts are assembled.

Another object is the provision of a coupling between a driving shank and a wrench socket member which comprises a set of splines adapted to transmit torsional impacts, and a retaining device engageable with the socket member along a shoulder provided at the front end of the splines.

A further object is to adapt the locking device for engagement with anyone of a set of circumferentially spaced splines thus making the locking device effective in any selected angular position of the socket member relative to the shank.

A still further object is to make the locking device accessible from the front end of the shank for quickly releasing the locking device for movement to the retracted position when that is desired. A feature of this invention is a spring pressed plunger controlling the detent, the front end of the plunger lying adjacent the front extremity of the driving shank and arranged to be engaged by a screwdriver or the like inserted through the socket member.

Still another object of the invention resides in a set of driven splines within the socket member, each spline having a chamfer or cam shoulder at its oppsite ends for engagement with the locking bolt or detent to move the latter to retracted position.

Another object is to enable the locking bolt or detent to be so located that the radial hole in the shank which supports the detent lies forward of the part of the shank which is subjected to torsional strain and thereby avoids the danger of breakage or fatigue failure adjacent the hole.

Other objects and features of the present invention will appear more clearly from the following description taken in connection with the accompanying drawings and appended claims.

In the drawings, which illustrate two alternative embodiments of the invention:

Figure 1 is a longitudinal section of a shaft and socket member, in assembled relation together with the retaining means, portions of the latter being shown in elevation;

Fig. 2 is an enlarged longitudinal section of the retaining means together with fragmentary portions of the socket member and shaft in assembled relation, also showing in broken lines the position of the socket member relative to the shaft after the splined connection has been loosened by wear;

Fig. 3 is a longitudinal section showing the position of the socket and shaft in the process of being assembled, or disassembled, with a screwdriver holding the retaining means in non-locking position;

Fig. 4 is an elevational view of the front end of the assembly, shown in Fig. 1, part of the socket member being broken away;

Fig. 5 is a fragmentary longitudinal section as indicated by the arrows 5 in Fig. 4;

Fig. 6 is a cross-section as indicated by the arrows 6 in Fig. 3 with portions of the shaft broken away, the detent being shown in full lines in non-locking position;

Fig. 7 is a detail view of the snap ring which secures the spring pressed plunger within the shaft;

Fig. 8 is a front elevational view of the plunger;

Fig. 9 is a longitudinal section of the plunger;

Fig. 10 is a plan view of the plunger;

Fig. 11 is a side elevation of the locking bolt or detent;

Fig. 12 is a front elevational view of the detent;

Fig. 13 is a plan view of the detent; and

Fig. 14 is a fragmentary section on the line 14—14 of Fig. 6 looking downward;

Fig. 15 is a section through the detent and a fragmentary portion of the shank taken along the line 15—15 in Fig. 14; and Fig. 16 is a longitudinal section similar to Fig. 1 but showing a modified socket member.

Figs. 1 and 16 are drawn to a smaller scale than the remaining figures.

Referring to Fig. 1, the preferred form of invention is illustrated as applied to a rotatable shaft 15 adapted to form the driven element of a power operated impact wrench, the shaft having at its rear end the usual anvil portion 16 comprising one or more jaws 17 adapted to be driven by a rotatable hammer (not shown). The shaft has a cylindrical portion 18, adapted to be supported for rotation in the impact wrench housing (not shown), and has a forwardly extending shank 19 adapted to project within the rear portion of the wrench socket member 20. The front portion of the socket member is provided with an hexagonal recess 21 to receive and drive a nut or bolt (not shown). To facilitate insertion of the latter into the socket member the recess is formed with a chamfered portion 22 shown best in Figs. 4 and 5. The chamfered portion 22 comprises six frusto-conical surfaces each bounded by two planes at right angles to each other.

In order to provide a detachable driving connection between the shaft 15 and the socket member 20, the shank portion 19 is provided with a series of circumferentially spaced longitudinally extending splines 23 separated by longitudinal grooves 24. The driving splines 23 extend into complementary longitudinal grooves 25 (Fig. 6) formed in the wrench socket member, the latter grooves being separated by driven splines 26 extending inwardly from the socket member 20 and engaging between the driving splines 23 on the shaft. The splined connection 23, 24, 25, 26 permits relative longitudinal or axial movement between the shaft 15 and socket member 20 but prevents any appreciable relative movement in a rotary direction, whereby the full force of the torsional impacts are transmitted from the shaft to the socket member without being attenuated on account of any lost motion connection.

To facilitate reception of the shank 19 into the socket member 20, the socket splines 26 are provided with a chamfer or inclined shoulder 27 on their rear ends, the chamfered faces forming discrete segments of a cone projecting forwardly toward an apex co-axial with the center of the shank and socket member. A similar chamfer or inclined shoulder 28 is formed near the front end of the driving splines 23 on the shank, but is separated from the front extremity of the shank by a pilot portion 29. The pilot portion consists of cylindrical surfaces broken up by the bottom portions of the longitudinal grooves 24.

The longitudinal grooves 24 in the shank are cut by a conventional hobbing machine with the result that the bottom of each longitudinal groove 24 extends in a straight line from the front extremity of the shank 19 up to the point 31 (Figs. 2 and 3) beyond which the groove curves with increasing slope until it vanishes or merges with the cylindrical portion 18 at the point 32. Preferably the bottom of the groove 24, between the points 31 and 32, is in the shape of a circular arc tangent at the point 31 with the straight part of the bottom of the groove. When the parts are new, the splined shank may be inserted into the socket only to the extent indicated in full lines in Fig. 2 where the point of tangency 31 lies adjacent the vertex of the angle formed by the longitudinal inner edge of the driven spline 26 and the chamfer 27. As the splined connection becomes worn in use, however, the main part of the driven spline 26 gradually penetrates into the restricted part of groove 24 between the points 31 and 32. In using this invention, the operator presses the tool, including the driving shank 19, against the socket member 20, and the axial thrust is sustained by the rear ends 27 of the driven splines against the wash-out portion of the hobbed grooves 24. The invention makes it possible for the thrust to be sustained in this manner because it does not put any axial thrust upon a retaining pin. The final position of the worn out socket member relative to the shank 19 is illustrated in dot-dash lines in Fig. 2.

In order to prevent the socket member 20 from becoming accidentally detached from the driving shaft 15, the present invention provides a locking bolt or detent 34 mounted for sliding movement in a transverse or radial bore 35 in the shank 19. As shown in Figs. 3, 11, 12 and 13, the detent has a convex upper tip 36 preferably shaped as a spherical zone, a cylindrical portion 37 lying below the convex tip and fitting the radial bore 35, and a base portion 38 separated from the cylindrical portion by a shoulder 39. As seen in Fig. 6, the center of the radial bore 35 lies midway between two adjacent driving splines 23 with the result that only a small part of both splines is cut away. As seen in Figs. 1, 2 and 3, the radial bore 35 is situated near the front end of the shank 19, a part of the bore opening into the chamfered portion 28 of the driving splines 23. This location is forward of the area where the torque is transmitted through the splines, and therefore obviates or lessens the danger of breakage or fatigue failure of the shank 19 because the latter is not subjected to any substantial torsional strain in the cross sectional area which includes the radial bore.

When the detent 34 is in its retracted position, shown in Figs. 3 and 6, the convex tip 36 lies below the longitudinal groove 24 of the shank and out of the path of movement of the driven splines 26, and therefore does not interfere with axial movement of the socket member 20 in either direction relative to the shaft 15. When the detent 34 is extended, however, as shown in Figs. 2 and 4, the convex tip 36 lies in the direct path of movement of the driven splines 26. In its extended position the convex 36 is adapted to engage an inclined shoulder 40 formed on the front end of the associated driven spline 26. Preferably, there is a similar inclined shoulder 40 formed on each of the driven splines so that the detent may be effective in any selected angular relation between the driving shaft 15 and the socket member 20. The shoulders 40 are arranged to form discrete segments of a cone tapering rearward toward an apex in line with the center of the socket member. Each shoulder extends from the crest of the driven spline 26 outward and rearward to the root of the driven spline where the inclined shoulder 40 meets a rounded corner 41 connected to an annular recess 42 formed in the socket member 20 near the mid-portion thereof. Preferably, the recess 42 is of cylindrical shape and has a diameter slightly exceeding the depth of the longitudinal grooves 25. In the process of manufacture of the socket member 20, the cylindrical, frusto-conical and toroidal surfaces are formed by a machining operation, and then the longitudinal grooves 25 are cut by a broaching operation to form the driven splines 26. In the operating condition of the parts, as shown in Fig. 2, the convex tip 36 on the detent engages the associated inclined shoulder 40 when the parts are new but lies forward of the shoulder 40 in operating condition when the parts are worn. If desired, however, the detent may be positioned to lie forward of the inclined shoulder even when the parts are new, the relative axial position not being critical. Upon application of a force tending to remove the socket member 20 from the shank 19, the inclined shoulder 40 engages the detent with a camming action and thus tends to move it downward or radially inward. As long as the detent is locked against such downward movement, however, the socket member is positively locked against separation from the shank.

When the socket member 20 is pulled away from the shank 19 with sufficient force to overcome friction, the inclined shoulder 40 acts as a cam to force the detent downward to retracted position, and thus permits removal of the socket, provided, however, that the inner end of the detent is unopposed in such motion.

The means for selectively permitting movement of the detent 34 to retracted position, or for positively locking it in extended position, will now be described. For the reception of such selective means, the shaft 15 is provided with an axial bore 43, an intermediate counterbore 44 in front of said bore, and a larger counterbore 45 extending to the front extremity of the driving shaft 15. The intermediate counterbore supports for relative axial (but not relative rotative) movement, the cylindrical or stem portion 46 of a plunger 47, which is shown in detail in Figs. 8, 9 and 10. The plunger has a head portion 48 generally of cylindrical shape and slidably fitting the large counterbore 45, the front end of said head terminating in a shoulder 49 normally seated against a snap ring 51 (Fig. 7). The snap ring is mounted in an annular groove 52 formed in the large counterbore 45. To facilitate removal of the snap ring, the front extremity of the drive shaft 15 is provided with a pair of recesses 53 (Fig. 4) permitting the reception of an implement such as a screwdriver (not shown) between the snap ring and the surrounding annular groove 52. The plunger shoulder 49 is yieldingly held in its extreme forward position, in engagement with the snap ring 51, by means of a compression spring 54 interposed between the driving shaft 15 and the plunger 47, the rear portion of the spring fitting within the axial bore 43 and the front portion fitting within a counterbore 55 (Fig. 9) formed at the rear end of the plunger 47. When the plunger is in its normal forward position, as shown in Fig. 2, the cylindrical stem 46 thereof fits within a cylindrical recess 56 (Fig. 12) at the inner end of the detent 34, and thus positively locks the detent in its extended position, while the detent in turn acts as a positive lock upon the inclined shoulder 40. The detent shoulder 39 has a cross section in the shape of a square whose sides are each equal in length to the diameter of the cylindrical portion 37 of the detent but whose corners project outwardly a substantial distance beyond the diameter of portion 37 as shown in Figs. 13, 14 and 15. The radial or transverse bore 35 in shank 19 has the same diameter as the cylindrical portion 37 with the result that the detent shoulder 39 cannot enter into the radial bore but instead is adapted to abut against the large counterbore 45 to limit outward movement of the detent toward extended position when such movement is not otherwise limited by engagement with the socket member 20. Below the shoulder 39, the detent has a tapered portion 58 adapted to be received within a correspondingly tapered recess 59 provided in the plunger 47, when the latter is forcibly displaced against the pressure of spring 54, to the unlocking position shown in Figs. 3 and 6.

In the use of the preferred form of invention, when the operator desires to attach the socket member 20 to the shaft 15, he holds these two elements approximately in axial alignment and moves them together until the pilot portion 29 abuts against the chamfer 27 and starts to enter the central opening which is surrounded by the driven splines 26. The chamfer guides the pilot portion toward the center of that opening and the socket member and shaft are then aligned axially, with the beveled front edges 28 of the driving splines 23 seated against the chamfered shoulder 27. The operator then orients the socket member 20 and shaft 15 to bring the driving splines 23 into alignment with the grooves 25 between the driven splines 26 and vice versa. The splines move a slight distance into interengaging relation when axial motion is arrested by engagement of the convex tip 36 of the locking bolt or detent 34 with the chamfered shoulder 27. At this time, the detent is positively locked against inward or retracting movement by the plunger 47. Outward movement of the detent, however, is limited by engagement of shoulder 39 with the large counterbore 45 so that the detent does not engage any part of the socket member outwardly of the chamfered shoulder 27. The operator then releases the plunger by inserting his finger, or a suitable implement such as a screwdriver 60 (Fig. 3), through the front end of the socket member 20 to engage the front face of the plunger 47 and move it away from the snap ring 51 with the plunger recess 59 positioned to receive the tapered portion 58 at the inner end of the detent. Thereupon the chamfered shoulder 27 reacts upon the convex tip 36 to displace the detent 34 to its inward or retracted position by a camming action, and the splined shank 19 may be inserted freely into the splined portion of the socket member 20. As soon as the detent 34 passes beyond the chamfered shoulder 27 and engages the longitudinal crest of the associated driven spline 26, the screwdriver 60 may be released, as the engagement with the driven spline prevents the detent from being extended. After the detent passes the main part of the driven spline 26 and starts to engage the inclined shoulder 40, the detent is released for movement to the extended or locking position. Assuming that the manual force has been removed from the plunger 47, the detent is moved outward by the camming action of the rear part of tapered recess 59 on the tapered portion 58 of the detent, as the spring 54 moves the plunger 47 forward into or toward engagement with the snap ring 51. The parts then occupy the position shown in Fig. 2 with the stem 46 of the plunger locking the detent 34 against inward or retracting movement, and the detent acting on the inclined shoulder 40 to lock the socket member 20 against separation from the driving shank or anvil. To remove the socket member, the operator simply unseats the plunger as illustrated in Fig. 3 and separates the socket member from the shank with a pulling or hammer action. Axial movement of the socket member in a releasing direction causes the inclined shoulder 40 to cam the detent 34 toward release position, as described in connection with the chamfered shoulder 27.

If desired, the periphery of the socket member 20 may be provided with depressions or recesses 61 for the reception of a bright plastic material (not shown) to enable the operator to count the number of turns, or half turns, of the socket member under impacting conditions and thus control the tightness of the nut or bolt (not shown) driven by the socket member.

Fig. 16 shows a modified socket member 62 open at its rear end to provide a splined socket 63 communicating with a cylindrical recess 64. Socket member 62 comprises driven splines 65, each provided with an inclined shoulder 66 having the same shape as the splines 26 and shoulders 40 respectively in the Fig. 1 embodiment. The modified socket member 62 is welded at 67 to a cylindrical sleeve 68. The assembly comprising the socket member 62 and the cylindrical sleeve 68 is commonly known as an extension bar and is designed for certain applications where it is desired to drive a nut or bolt (not shown) located remotely from the spline shank 19. The splined socket 63 detachably receives a shaft, which is like the one shown in Fig. 1 and which comprises a shank 19 and driving splines 23, and which has a radially movable detent 34 controlled by an axially movable plunger 47 engaged by a spring 54, all arranged as in Fig. 1. In order to provide access to the plunger 47, the cylindrical sleeve 68 is provided with a lateral hole 69. The hole has a size and angle of inclination adapted for the insertion of a suitable implement 70 through the hole 69 and into the front end of counterbore 45 to unseat the plunger 47 against the pressure of spring 54, as shown in Fig. 16.

The rotary impact wrench structure shown in Fig. 1 is claimed in a divisional application Serial No. 14,110, filed March 10, 1960, entitled Rotary Impact Tool, said divisional application being directed to the location of the transverse bore 35 with respect to the region of torsional strain in the splined shank 19. The socket 20, per se, and the method of making the socket, are claimed in a second divisional application, Serial No. 38,192, filed June 23, 1960, entitled Splined Socket Member for Wrenches.

What is claimed is:

1. A coupling comprising a shank having a portion of non-circular cross-section and having an axial bore open at the front extremity of the shank, a socket member having a non-circular recess detachably fitting the corresponding portion of the shank to form a driving connection therebetween, the shank having a transverse bore extending outward from the axial bore, a detent slidably mounted in said transverse bore, the socket member having a shoulder adapted for locking engagement with the detent when the latter is in its extended position, but adapted to clear the detent when the latter is in its retracted position, said socket member being movable axially of the shank whenever the detent is in the retracted position a plunger slidably mounted in the axial bore and movable forward and rearward, the plunger having a locking surface obstructing inward movement of the detent to positively prevent retraction of the latter when the plunger is in its forward position, said plunger having means to permit retracting movement of the detent when the plunger is in its rear position, yieldable means for holding the plunger in its forward or locking position, said plunger having a front face accessible through the socket member and adapted to be engaged and displaced for movement of the plunger rearward against the yieldable means to release the detent for retracting movement.

2. A coupling as defined in claim 1, in which the shoulder tapers rearwardly to provide a camming engagement with the detent to move the latter to retracted position upon separating movement of the socket member in a forward direction relative to the shank.

3. A coupling comprising a rotatable shank having a portion of non-circular cross-section, a socket member having a non-circular recess detachably fitting the corresponding portion of the shank to form a driving connection therebetween, the shank having an axial bore and a counterbore at the front end of the axial bore, the shank having a transverse bore extending outward from the counterbore, a detent slidably mounted in said transverse bore, the socket member having a shoulder adapted for locking engagement with the detent when the latter is in its extended position, but adapted to clear the detent when the latter is in its retracted position, a plunger having a stem portion slidably mounted in the bore and having a head portion mounted in the counterbore, the head portion of the plunger having a locking surface registering with the detent to prevent retraction of the latter when the plunger is in its forward position, said plunger being arranged to permit retracting movement of the detent when the plunger is in its rear position, and yieldable means for holding the plunger in its forward or locking position, said plunger having a front end accessible through the socket member and adapted to be engaged and displaced for movement of the plunger rearward against the yieldable means to release the detent for retracting movement.

4. A coupling according to claim 3, in which the shank has a transverse wall between the bore and counterbore, said transverse wall acting as a positive stop to limit rearward movement of the plunger.

5. A coupling according to claim 3, in which the head portion of the plunger has a forwardly facing shoulder, and which includes a snap ring mounted in the counterbore, said snap ring being engageable with the last mentioned shoulder to act as a positive stop limiting forward movement of the plunger, said snap ring being insertable into and removable from the counterbore through the front end thereof.

6. A coupling according to claim 3, in which the head of the plunger has a recess arranged to receive the detent when the plunger is in its rear position, the rear end of the recess being engageable with an inclined portion on the detent to urge the latter outwardly when the plunger is urged forwardly by said yieldable means.

7. A coupling comprising a shank having a portion of non-circular cross-section and having an axial bore open at the front extremity of the shank, a socket member having a non-circular recess detachably fitting the corresponding portion of the shank to form a driving connection therebetween, the shank having a radial bore extending outward from the axial bore, a detent slidably mounted in said radial bore, the socket member having a shoulder adapted for locking engagement with the detent when the latter is in its extended positoin, but adapted to clear the detent when the latter is in its retracted position, a plunger slidably mounted in the axial bore and movable forward and rearward, the plunger having a locking surface registering with the detent to prevent retraction of the latter when the plunger is in its forward position, said plunger having means to permit retracting movement of the detent when the plunger is in its rear position, yieldable means for holding the plunger in its forward or locking position, said plunger having a front face accessible through the socket member and adapted to be engaged and displaced for movement of the plunger rearward against the yieldable means to release the detent for retracting movement, the front face of the plunger, when in its forward position, lying adjacent the front end of the shank and in a plane extending radially of the latter.

8. A coupling according to claim 7 in which the radial plane of the front face of the plunger lies forwardly of the detent in all positions of the plunger.

9. A coupling comprising a shank having a portion of non-circular cross-section and having an axial bore open at the front extremity of the shank, a socket member having a non-circular recess detachably fitting the corresponding portion of the shank to form a driving connection therebetween, the shank having a radial bore extending outward from the axial bore, a detent slidably mounted in said radial bore, the socket member having a shoulder adapted for locking engagement with the detent when the latter is in its extended position, but adapted to clear the detent when the latter is in its retracted position, a plunger slidably mounted in the axial bore and movable forward and rearward, the plunger having a locking surface registering with the detent to prevent retraction of the latter when the plunger is in its forward position, said plunger having means to permit retracting movement of the detent when the plunger is in its rear position, yieldable means for holding the plunger in its forward or locking position, said plunger having a front face accessible through the socket member and adapted to be engaged and displaced for movement of the plunger rearward against the yieldable means to release the detent for retracting movement, the driving connection between the shank and socket member comprising a series of longitudinal interengaging splines, said shoulder being provided at the front end of one or more of the splines on the socket member, said splines being circumferentially spaced at a uniform distance, all of the splines on the socket member being provided with shoulders of similar shape whereby the plunger and detent may cooperate with an associated spline in any selected angular position of the socket member relative to the shank, each spline shoulder tapering rearwardly.

10. A coupling comprising a shaft having adjacent its front end a series of longitudinal splines uniformly spaced around its circumference and separated by longitudinal grooves, a socket having an opening at its rear end arranged for the reception of the shaft, the socket having longitudinal splines and grooves around said opening and interengaging with the grooves and splines respectively on the shaft, each socket spline having a locking shoulder at its front end and having a longitudinal crest extending rearward from the locking shoulder, the shaft having an axial bore open at the front extremity of the shaft and having a transverse bore extending outward from the axial bore, a locking detent slidably mounted in said transverse bore and arranged to engage the shoulder when in extended position but to clear the shoulder when in retracted position, the axis of the transverse bore being disposed in the same radial plane as one of the shaft grooves whereby the detent will be in circumferential alinement with one of the socket splines whenever the splines are interengaged in any selected circumferential relation, a plunger mounted in the axial bore for reciprocation between a forward and a rearward position, means engageable with the detent for selectively holding it in extended position when the plunger is in its forward position and for releasing it for inward movement when the plunger is in its rear position, resilient means for biasing the plunger and detent toward a forward and outward position respectively, and manipulative means on the front end of the plunger for moving the plunger rearwardly in opposition to the resilient means, the socket having an opening positioned forwardly of the splined portion thereof to provide access to such manipulative means.

11. A coupling according to claim 10, in which the front extremity of the plunger, whenever in releasing position, lies rearwardly of the front extremity of the shaft.

12. A coupling according to claim 10, in which the detent and plunger have interengaging cam surfaces and in which the resilient means for holding the plunger in its forward position comprises a compression spring, said spring cooperating with said cam surfaces to impart forward movement to the plunger and outward movement to the detent at the same time and as the spring expands, said spring being prevented from expanding during the period when the socket is partly assembled on the shaft and while the detent is passing over the longitudinal crest on the associated socket spline, but being arranged to expand automatically to move the detent outward when the detent registers with the locking shoulder.

13. A coupling comprising a shaft having adjacent its front end a series of longitudinal splines uniformly spaced around its circumference and separated by longitudinal grooves, a socket having an opening at its rear end arranged for the reception of the shaft, the socket having longitudinal splines and grooves interengaging with the grooves and splines respectively on the shaft, each socket spline having at its front end a shoulder inclined outwardly and forwardly and having a longitudinal crest extending rearward from the shoulder and having a chamfered edge diverging from the longitudinal crest to the rear extremity of the socket, the shaft having an axial bore open at the front extremity of the shaft and having a transverse bore extending outward from the axial bore, a locking detent slidably mounted in said transverse bore and arranged to engage the shoulder when in extended position but to clear the shoulder when in retracted position, said detent being engageable at times with the chamfered edge, the axis of the transverse bore being disposed in the same radial plane as one of the shaft grooves whereby the detent will be in circumferential alinement with one of the socket splines whenever the splines are interengaged in any selected circumferential relation, yieldable means for holding the detent in extended position in locking engagement with the shoulder, manipulative means for disabling the yieldable means to effect inward movement of the detent, the socket having a front opening located forwardly of the shaft, said manipulative means being accessible through said front opening and through the front end of the axial bore.

14. A coupling according to claim 13, in which each shaft spline has a longitudinal crest which is cut away at the front end to form a pilot portion of reduced radial depth and also has an inclined shoulder diverging rearwardly from the pilot portion, the pilot portions of the shaft splines being engageable with the chamfered edges of the socket to aline the shaft axially with the socket upon initial insertion thereof, the outside diameter of the shaft at the pilot portion being no greater than the inside diameter of the socket splines to permit entry of the pilot portion within the socket splines, the inclined shoulders on the shaft splines being engageable with the chamfered edges of the socket splines to prevent further entry of the shaft into the socket until the shaft splines are indexed into rotative alinement with the grooves between the socket splines.

15. A coupling according to claim 14, in which the bottom of each groove in the shaft extends in a straight line from the front extremity of the shaft to a point adjacent the rear end of the socket in the assembled position of the latter, the bottom of said groove curving outwardly and rearwardly from said point, whereby axial thrust of the socket is sustained by the wedging action of the rear end of the socket splines in the narrowing portions of the shaft grooves; and in which the socket has a recess in front of the socket splines, said recess being of substantial axial depth to permit the detent to move forward out of engagement with the inclined shoulders on the socket splines as the rear ends of the splines become worn, without transmitting axial thrust through the detent.

References Cited in the file of this patent

UNITED STATES PATENTS

| | | |
|---|---|---|
| 1,132,375 | Myers | Mar. 16, 1915 |
| 1,371,750 | Fox | Mar. 15, 1921 |
| 1,982,008 | Mandl et al. | Nov. 27, 1934 |
| 2,009,371 | Junge | July 23, 1935 |
| 2,027,922 | McNaught | Jan. 14, 1936 |
| 2,108,866 | Mandl | Feb. 22, 1938 |
| 2,202,240 | Trotter | May 28, 1940 |
| 2,271,803 | Pfeiffer et al. | Feb. 3, 1942 |
| 2,283,514 | Stanworth | May 19, 1942 |
| 2,566,661 | Hamlin | Sept. 4, 1951 |
| 2,623,418 | Vaughan | Dec. 30, 1952 |
| 2,634,642 | Viets | Apr. 14, 1953 |
| 2,816,770 | De Vlieg et al. | Dec. 17, 1957 |